United States Patent [19]

Le Guelennec

[11] 4,204,450
[45] May 27, 1980

[54] SHEAR FOR LARGE-SIZED SCRAP

[75] Inventor: Emile Le Guelennec, Pont-Scorff, France

[73] Assignee: Machines et Applications, France

[21] Appl. No.: 918,294

[22] Filed: Jun. 21, 1978

[30] Foreign Application Priority Data

Sep. 9, 1977 [FR] France ................... 77 27319

[51] Int. Cl.² ............................................. B26D 5/12
[52] U.S. Cl. ......................................... 83/461; 83/636; 83/644
[58] Field of Search ........................... 83/644, 461, 636

[56] References Cited

U.S. PATENT DOCUMENTS 3,136,193  6/1964  Gantz ................... 83/644 X
3,530,761  9/1970  Erwin ................... 83/644

FOREIGN PATENT DOCUMENTS 1137783  1/1957  France ................... 83/644
1425147  12/1965  France ................... 83/644

Primary Examiner—Frank T. Yost
Attorney, Agent, or Firm—William A. Drucker

[57] ABSTRACT

This shear for cutting relatively heavy, thick and large-sized metal sheets and plates, which comprises a movable blade and fixed blade, has the ends of the movable blade carrier pivotally mounted to the movable members of a pair of lateral spaced actuators, one being pivoted through crank means, so that the movable blade carrier can be actuated for cutting the metal by bearing against one or the other of its ends.

1 Claim, 2 Drawing Figures

SHEAR FOR LARGE-SIZED SCRAP

BACKGROUND OF THE INVENTION

FIELD OF THE INVENTION

The present invention relates in general to metal sheet or plate shears and has specific reference to a shear for cutting large-sized scrap, notably non-homogeneous scrap, for example for the recovery of ships' plates.

SUMMARY OF THE INVENTION

The purpose of the present invention is to allow a certain variation in the cutting force exerted by a movable blade co-acting with a fixed blade.

For this purpose, the movable blade is mounted on a blade carrier actuated at either ends by two pivot pins one or both of which may act as a fixed reaction or bearing point whereby a cutting effort variable as a function of the distance between the point of application of the force and the bearing point can be applied by the movable blade to the metal to be cut.

In order to afford a clear understanding of this invention, a typical preferred form of embodiment thereof will now be described by way of example with reference to the diagrammatic drawing attached hereto.

DESCRIPTION OF THE PREFERRED EMBODIMENT

Figure 1:
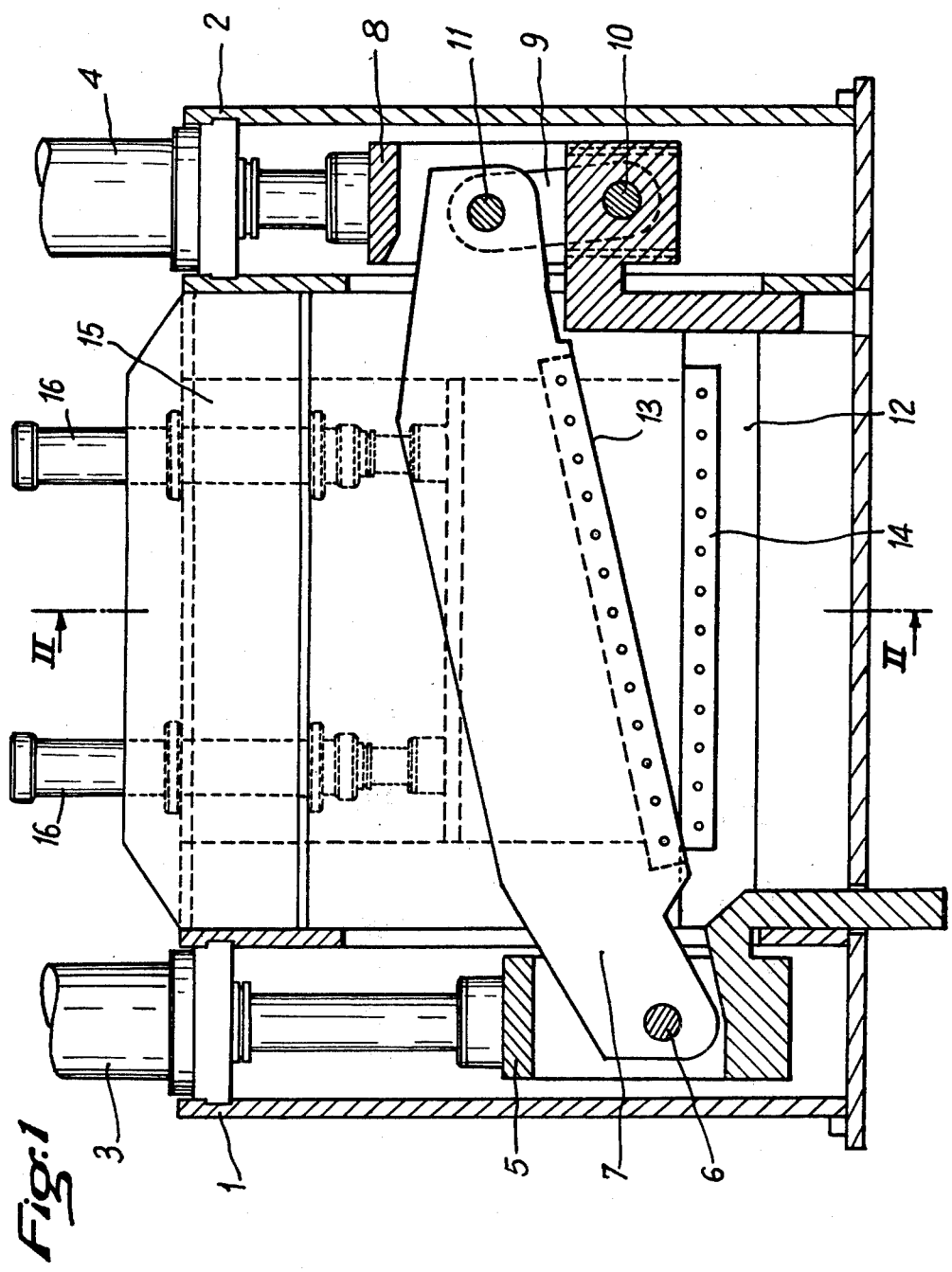
FIG. 1 is a front elevational view of the shear, in which the means actuating the two ends of the movable blade support are shown in fragmentary section.
Figure 2:
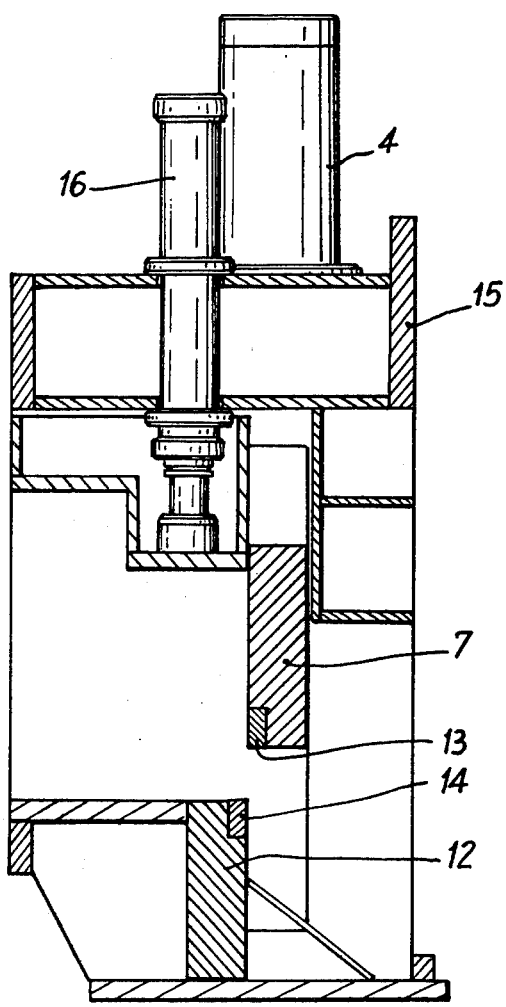
FIG. 2 is a vertical section taken along the line II—II of FIG. 1.

The shear illustrated in the drawing comprises essentially a pair of spaced vertical lateral columns 1, 2 each adapted to support a vertical, high-power hydraulic cylinder 3,4. The cylinder 3 of column 1 is operatively connected to an assembly 5 guided for vertical reciprocation and supporting a pivot pin 6 to one end of a movable blade carier 7. The other cylinder 4 associated with column 2 is connected to an assembly 8 also guided for vertical reciprocating motion and connected to the opposite end of the movable blade carrier 7 via cranks 9 pivoted to said assembly 8 and to the blade carrier 7 by means of pivot pins 10 and 11.

The pair of vertical columns 1 and 2 are interconnected at their lower ends by the transverse anvil 12 constituting a fixed blade carrier: the upper movable blade 13 is secured to the movable blade carrier 7 and the lower fixed blade 14 is secured to said transverse anvil 12. At their upper portions, the lateral columns 1, 2 are interconnected by an assembly of transverse members 15 supporting the vertical, fluid-operated presser cylinders holding the sheets or plates to be sheared. It is obvious that this machine may have relatively large dimensions and this may be obtained by varying the length of the transverse component elements of the machine, such as 12 to 15, interconnecting the two lateral columns 1, 2, without interfering with these two columns and the assembly of members forming an integral part thereof.

The shear according to this invention operates as follows. For cutting a metal plate or sheet, the movable component elements of the pair of vertical cylinders 3 and 4 controlling the movements of the movable blade 13 being in their uppermost position, the plate or sheet to be cut is inserted between the pair of blades 13, 14. Then, cylinder 3, for example, is lowered and carries along through the guided assembly 5 and pivot pin 6 the corresponding end portion of the movable blade carrier 7 to the lowermost position of this end portion, as illustrated in FIG. 1. Then the other cylinder 4 is actuated for lowering the other end portion of the movable blade carrier 7 by means of the guided assembly 8, cranks 9 and pivot pins 10, 11 until the plate or sheet is cut completely by the movable blade 13 of which the carrier member 7 reacts or bears against the pivot pin 6 previously brought to its lowermost position.

It is clear that the pivot pins 6 and 11 may be used by turns as bearing points to the movable blade carrier 7, so that the cutting force may be varied as a function of the distance between its point of application on the movable blade and the bearing point of the movable blade carrier 7, and this possibility is particularly advantageous when non-homogeneous scrap has to be cut, since in this case the necessary cutting power can be derived from the alternation of the bearing point.

Of course, many modifications and changes may be brought to the structure shown and described herein without departing from the basic principle of the invention as set forth in the appended claims.

I claim is:

1. A shear for cutting large-size plates and sheets of non-homogeneous scrap-irons comprising:
    (a) a frame supporting a lower fixed blade,
    (b) an upper movable blade adapted to engage said fixed blade.
    (c) a carrier for said movable blade,
    (d) a pair of vertical hydraulic-actuated cylinders, each having its movable portion guided for reciprocal vertical strokes,
    (e) a transverse pivot pin connecting the movable portion of one vertical hydraulic-actuated cylinder of said pair to one lateral end of the carrier of the movable blade,
    (f) a link having its lower end pivotally connected to the movable portion of the other vertical hydraulic-actuated cylinder of said pair and having its upper end pivotally connected to the other lateral end of said carrier of the upper movable blade, so that said link applies a traction force on the carrier of said movable blade when a lowering force is applied to the movable portion of the vertical hydraulic-actuated cylinder connected thereto,
    (g) and upper presser cylinders adapted to hold the piece to be cut in position on said fixed blade.

* * * * *